US008284410B2

(12) United States Patent
Lee

(10) Patent No.: US 8,284,410 B2
(45) Date of Patent: Oct. 9, 2012

(54) PRINTING APPARATUS COMPRISING SERIES-MODELS SUPPORTING FIRMWARE AND SERIES-MODELS SUPPORTING METHOD

(75) Inventor: Sung-hi Lee, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1245 days.

(21) Appl. No.: 10/826,299

(22) Filed: Apr. 19, 2004

(65) Prior Publication Data

US 2004/0258428 A1 Dec. 23, 2004

(30) Foreign Application Priority Data

Jun. 20, 2003 (KR) ........................ 10-2003-0040416

(51) Int. Cl.

| | |
|---|---|
| ***G06K 15/02*** | (2006.01) |
| ***G06F 3/12*** | (2006.01) |
| ***G06K 3/12*** | (2006.01) |
| ***H04L 29/06*** | (2006.01) |
| ***G06F 15/16*** | (2006.01) |
| ***G06F 15/177*** | (2006.01) |

(52) U.S. Cl. ..................... 358/1.11; 358/1.13; 358/1.15; 713/160; 709/206; 709/222

(58) Field of Classification Search ................. 358/1.13, 358/1.14, 1.15, 1.9, 426.01, 1.2; 707/206, 707/100; 709/206, 222; 710/15; 713/2, 713/160, 100; 715/255

See application file for complete search history.

(56) References Cited

U.S. PATENT DOCUMENTS

| | | | | |
|---|---|---|---|---|
| 6,298,421 | B1 * | 10/2001 | Minamizawa et al. | 711/151 |
| 6,704,122 | B2 * | 3/2004 | Moro et al. | 358/1.9 |
| 6,735,641 | B1 * | 5/2004 | Kobayashi et al. | 710/15 |
| 6,771,393 | B1 * | 8/2004 | Honary | 358/426.01 |
| 6,825,941 | B1 * | 11/2004 | Nguyen et al. | 358/1.15 |
| 7,019,861 | B2 * | 3/2006 | Aagesen | 358/1.15 |
| 7,036,076 | B2 * | 4/2006 | Anwar | 715/255 |
| 7,092,950 | B2 * | 8/2006 | Wong et al. | 707/100 |
| 7,136,174 | B2 * | 11/2006 | Chapin et al. | 358/1.13 |
| 7,142,321 | B2 * | 11/2006 | Tomita et al. | 358/1.15 |
| 7,595,902 | B2 * | 9/2009 | Yamaguchi et al. | 358/1.15 |
| 2002/0054344 | A1 * | 5/2002 | Tateyama | 358/1.15 |
| 2002/0097418 | A1 * | 7/2002 | Chang et al. | 358/1.13 |
| 2003/0035132 | A1 * | 2/2003 | Tomita et al. | 358/1.14 |
| 2003/0037115 | A1 * | 2/2003 | Tomita et al. | 709/206 |
| 2003/0231328 | A1 * | 12/2003 | Chapin et al. | 358/1.13 |
| 2004/0001207 | A1 * | 1/2004 | Nishimura | 358/1.2 |
| 2004/0268113 | A1 * | 12/2004 | Rothman et al. | 713/2 |

FOREIGN PATENT DOCUMENTS

| | | |
|---|---|---|
| JP | 08-123635 | 5/1996 |
| JP | 2001-67228 | 3/2001 |
| JP | 2001-067228 | 3/2001 |
| JP | 2001-159959 | 6/2001 |
| JP | 2002-351687 | 12/2002 |

* cited by examiner

*Primary Examiner* — Akwasi M Sarpong
(74) *Attorney, Agent, or Firm* — Staas & Halsey LLP

(57) ABSTRACT

A printing apparatus to perform a printing operation by driving hardware provided thereto according to a printing command received from a user, including a firmware unit to store function information of a plurality of models of the printing apparatus, and selectively perform the function of one of the plurality of models which corresponds to a model index designated as the printing apparatus is initialized.

12 Claims, 4 Drawing Sheets

PRINTING APPARATUS COMPRISING SERIES-MODELS SUPPORTING FIRMWARE AND SERIES-MODELS SUPPORTING METHOD

CROSS-REFERENCE TO RELATED APPLICATIONS

This application claims the benefit of Korean Patent Application No. 2003-40416, filed Jun. 20, 2003, in the Korean Intellectual Property Office, the disclosure of which is incorporated herein by reference.

BACKGROUND OF THE INVENTION

1. Field of the Invention

The present invention generally relates to a printing apparatus that comprises firmware capable of supporting series-models by adding a model index function, and a method of supporting the series-models in the printing apparatus.

2. Description of the Related Art

Generally, when a printing apparatus such as a printer is developed, a variety of derivative series-models are developed together, having slightly different functions on the basis of the main model. Prices and performance of such series-models vary. However, the basic functions are similar among the series-models, while each has slightly different additional functions.

Meanwhile, an external device, such as the printing apparatus, uses firmware thereof to independently drive its own mechanism. The firmware has an intermediate property between hardware and software, and refers to a program which permanently becomes a part of the device by being incorporated in a PROM (programmable read-only memory). In other words, the firmware refers to a program which is in charge of driving the printing apparatus and processing and controlling the print data, and mainly consists of a kernel unit and an emulation unit. The kernel unit is in charge of jobs such as driving the printer system, processing the print data, and controlling the printing operation, while the emulation unit is in charge of processing and converting the print data into a printer language so that the same form can be outputted as the user has initially written.

Based on the firmware support, the printing apparatus receives a printing command from a computer, thereby performing the printing operation according to the user's setting. Generally, the external device, such as the printing apparatus, incorporates components such as a ROM having the firmware stored therein.

On the other hand, while the derivation models have similar basic functions as those of the main model (hereinafter referred to as the printer, by way of an example), because the respective models also have slightly different functions, conventionally, different firmware for each model had to be separately developed and applied.

FIG. 1 shows various printer derivation models, each being applied with different firmware that is individually developed for the use of the individual model. With reference to FIG. 1, each of the printer models 10, 20, and 30 uses its own firmware 10', 20', and 30'. Accordingly, this development approach has a drawback in that the series-models having similar basic operations and functions require their own firmware to be separately developed only for a slight functional variation, resulting in increased time and cost of firmware development.

SUMMARY OF THE INVENTION

In order to overcome these and/or other problems, it is an aspect of the present invention to provide a printing apparatus having a firmware capable of supporting various functions of series-models by designating a model index of the printing apparatus, and a method of supporting the various series-models by the firmware. More specifically, a plurality of series-models can be supported through a single firmware by adding a model index function and a model index command designating the function in the firmware, instead of separately developing a firmware for each of the series-models having similar functions.

Additional aspects and/or advantages of the invention will be set forth in part in the description which follows and, in part, will be obvious from the description, or may be learned by practice of the invention.

In an effort to achieve the above and/or other aspects of the present invention, a printing apparatus according to an embodiment of the present invention comprises a firmware unit to store function information of a plurality of models of the printing apparatus, and selectively perform the function of one of the plurality of models which corresponds to a model index designated as the printing apparatus is initialized.

The firmware unit may comprise a storage unit to store the function information of the plurality of models therein, a model index processing unit to store a model index designation command received from outside the firmware unit, extract from the storage unit the function information which corresponds to the model index designated by the model index designation command upon the initialization of the printing apparatus, and output the extracted function information, and a firmware driving unit to control the hardware to receive the function information and perform a corresponding function.

The firmware unit may further comprise a data receiving unit to receive data from outside the firmware unit, and transmit the model index designation command to the model index processing unit in response to the model index designation command being in the received data, a data processing unit to receive the data excluding the model index designation command from the data receiving unit, and convert the data into corresponding printer language, and a data printing unit to control the hardware to output the converted data onto a printing medium.

According to the present invention, a method of supporting a plurality of models of a printing apparatus by a common firmware is also provided. The method comprises confirming a model index designation command which designates a model index corresponding to one of the plurality of printing apparatus models, extracting function information corresponding to the one of the plurality of printing apparatus models which is designated by the model index designation command, confirming a function of the designated model using the function information, and performing the function.

The method may further comprise inputting the model index designation command and storing the command in an initialization file, and confirming the model index designation command by executing the initialization file.

The method may further comprise writing a separate file which stores therein the model index designation command, storing the file in the printing apparatus through a printer interface, and confirming the model index designation command by executing the file, may be further provided.

The function of a basic model that is previously set may be performed in response to there being no function information corresponding to the designated model index.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
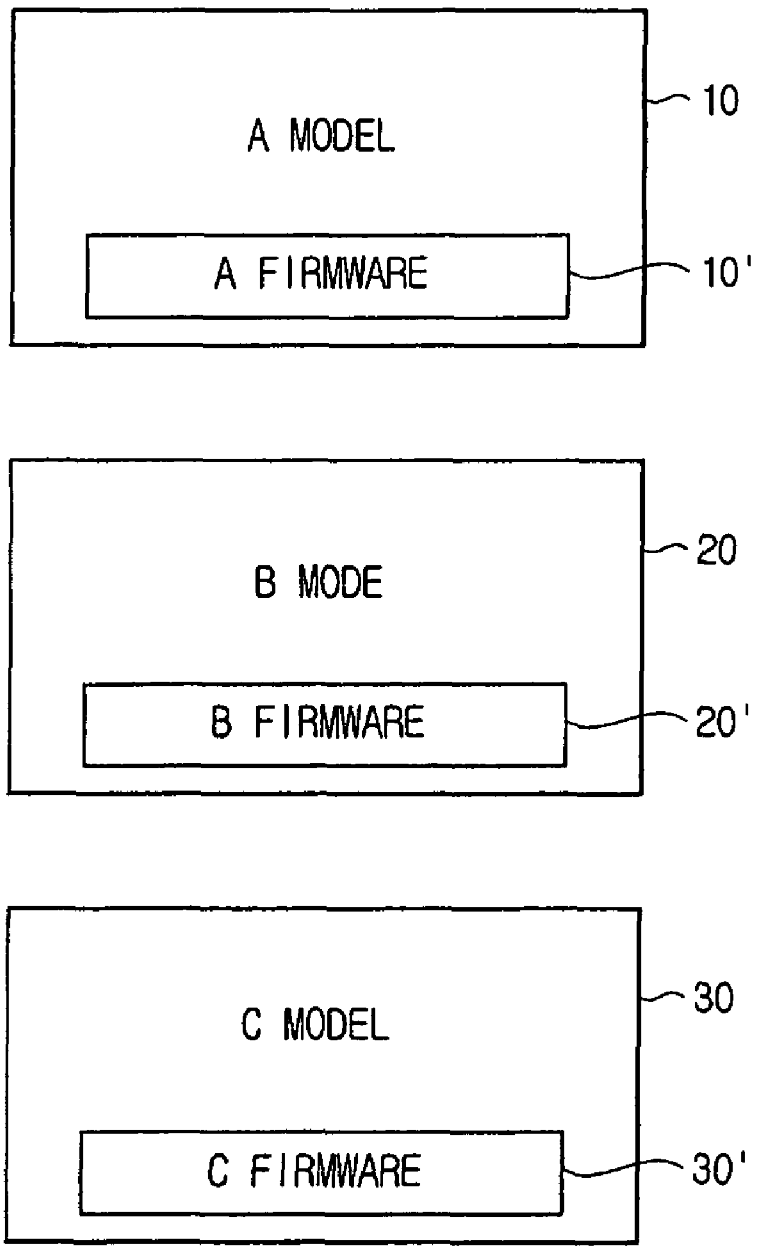
FIG. 1 (PRIOR ART)
FIG. 1 shows a plurality of conventional printer derivation models, each being applied with a firmware of its own which has been individually developed for its own use.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
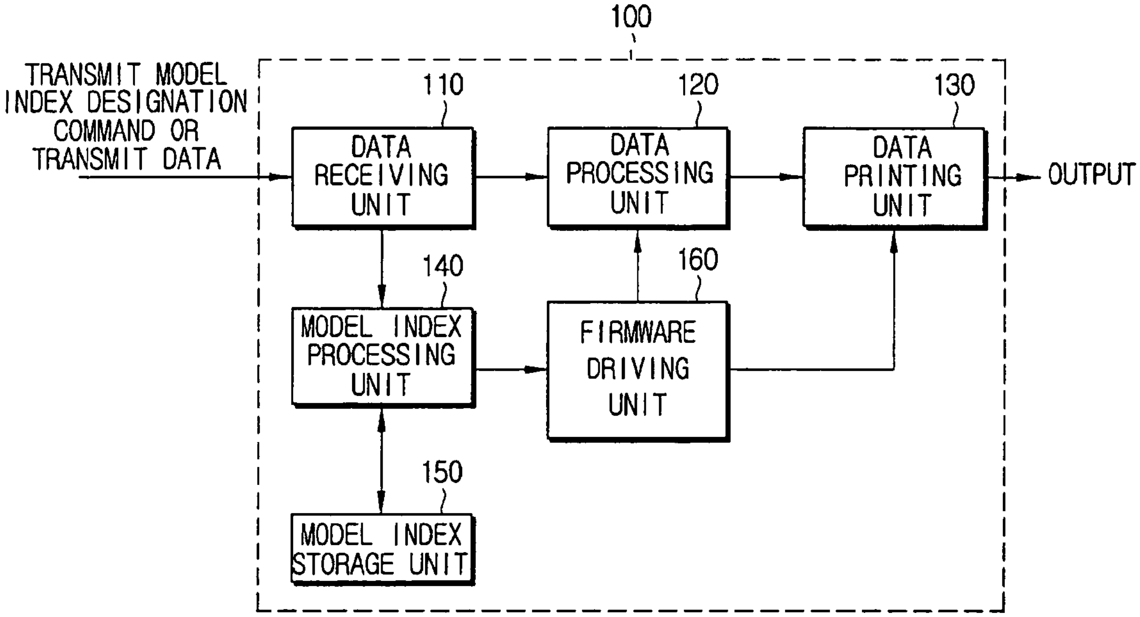
FIG. 2 is a schematic block diagram of a firmware unit according to an embodiment of the present invention.

FIG. 2 is a schematic block diagram of a firmware unit 100 of the printer according to an embodiment of the present invention. With reference to FIG. 2, the firmware unit 100 comprises a data receiving unit 110, a data processing unit 120, a data printing unit 130, a model index processing unit 140, a model index storage unit 150, and a firmware driving unit 160. As described above, the firmware refers to programs which perform jobs such as printer driving, printing data processing, and printing operation control. In the present embodiment, the overall portion which these programs are applied to will be collectively referred to as the firmware unit 100.

The user prepares a document using a PC and inputs a command to print. Accordingly, the PC transmits document data and a print command to a printer connected thereto. The firmware unit 100 of the printer receives the document data and converts the data into suitable printer language by using a predetermined emulation language. For example, a laser printer mainly uses an emulation language such as PCL® (Printer Command Language) of HP® and PostScript® of the ADOBE®.

The firmware unit 100 drives and controls the respective mechanical components of the printer based on the converted printer language, so that printing can be carried out properly. For example, when presented in a laser printer, the firmware unit 100 controls the paper feed roller, a laser scanning unit (LSU), a photosensitive drum such as an OPC drum, a charging roller, a developing roller, a transfer roller, and a fusing unit in the respective steps of the printing such as paper feeding, charging, light exposure, developing, image transfer, and image fusing. The firmware unit 100 operates in accordance with the functions supported by the printer. The printer may be provided with various functions, which include a toner save function, an automatic power save function, a one-touch duplex printing function, and an automatic paper size sensing function. The functions may vary depending on the model type of the printer. The variants of a certain type of printer may have the same major functions, while having a slight difference in details.

The model index storage unit 150 stores therein an index of printer models and their variants, together with information of the corresponding functions. Accordingly, as the manufacturer of the printer inputs a model index of the printer in the firmware unit 100, the firmware unit 100 checks the function corresponding to the index of the model index storage unit 150 and controls the printer to support the corresponding function.

More specifically, when predetermined data is inputted from outside, the data receiving unit 110 receives the data. The data receiving unit 110 sends the data out to the model index processing unit 140 if the received data is the command to designate the model index, and sends the data out to the data processing unit 120 if the received data is regular printing data.

The data processing unit 120 converts the received printing data into a suitable printer language so that the data can be output in the same form as the user has initially written, and sends the converted data to the data printing unit 130. The data printing unit 130 controls parts of the printer such as a developing machine and fusing machine, and the converted printing data is output onto a printing medium, for example, paper.

When the command to designate the model index is contained in the received data, the data receiving unit 110 transmits the received data pertaining to the model index to the model index processing unit 140. The model index processing unit 140 checks the designated model index, and reads the pre-stored model index information from the model index storage unit 150.

Meanwhile, designating the model index is usually performed by either adding the designation command in the printer file initialization, or writing a separate command file for the model index designation.

More specifically, adding the designation command in the printer file initialization involves transmitting the model index designation command along with initialization files through a printer interface during the manufacturing of the printers, so that the designation command can be processed in the initialization of the printer. Writing the separate command file for the model index designation involves writing a separate model index designation command file and transmitting the command file through the printer interface for processing by the firmware.

The model index storage unit 150 stores therein the information and index of the designated models. On receiving a model index designation command, the model index processing unit 140 confirms the corresponding model information from the model index storage unit 150.

When the model information corresponding to the designated model index is confirmed in the model index processing unit 140, the firmware driving unit 160 performs the model functions according to the confirmation model information.

Figure 3:
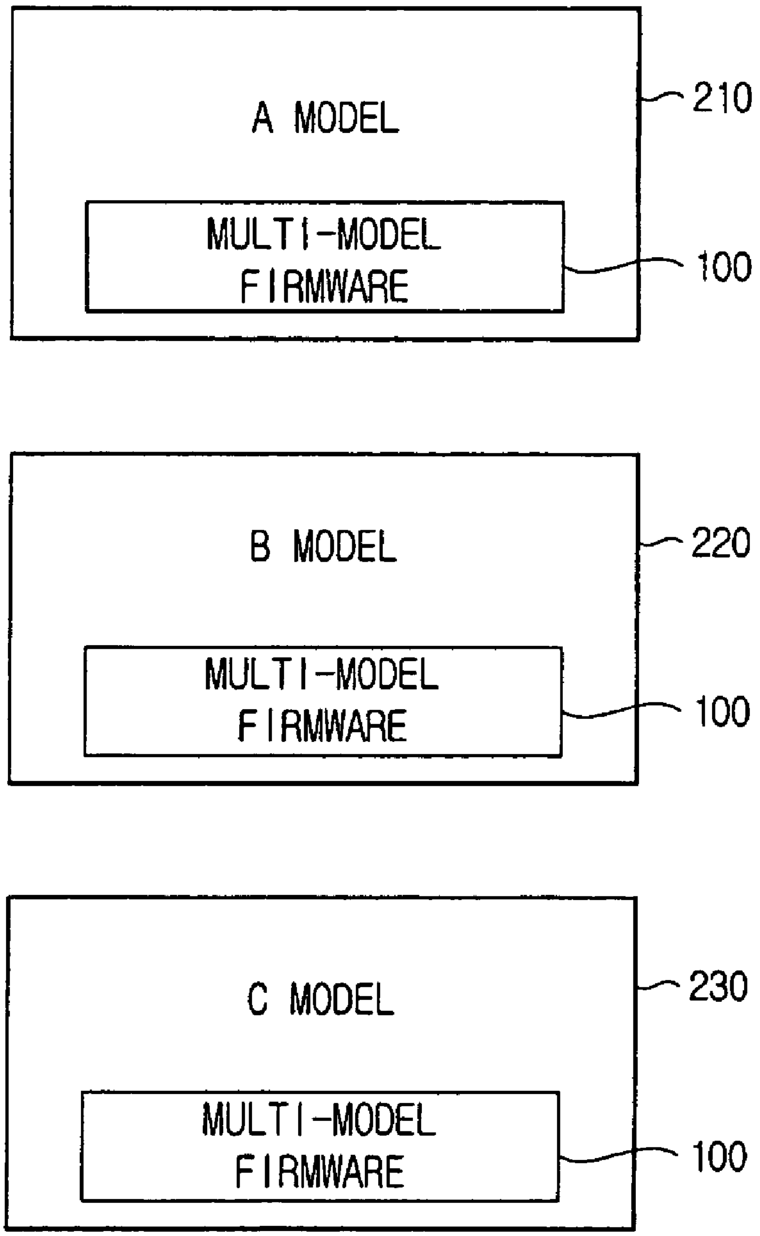
FIG. 3 is a view showing a plurality of printer derivation models being supported by a single firmware which is made according to an embodiment of the present invention.

Accordingly, various types of printer models can be developed to use a common firmware. FIG. 3 shows various types of printers 210, 220, 230 using a common multi-model firmware 100 for use in multiple models according to the present invention. Unlike the conventional case, which is shown in FIG. 1, the respective printer models 210, 220, 230 are not each supported by different firmware, but by one common multi-model firmware 100.

Figure 4:
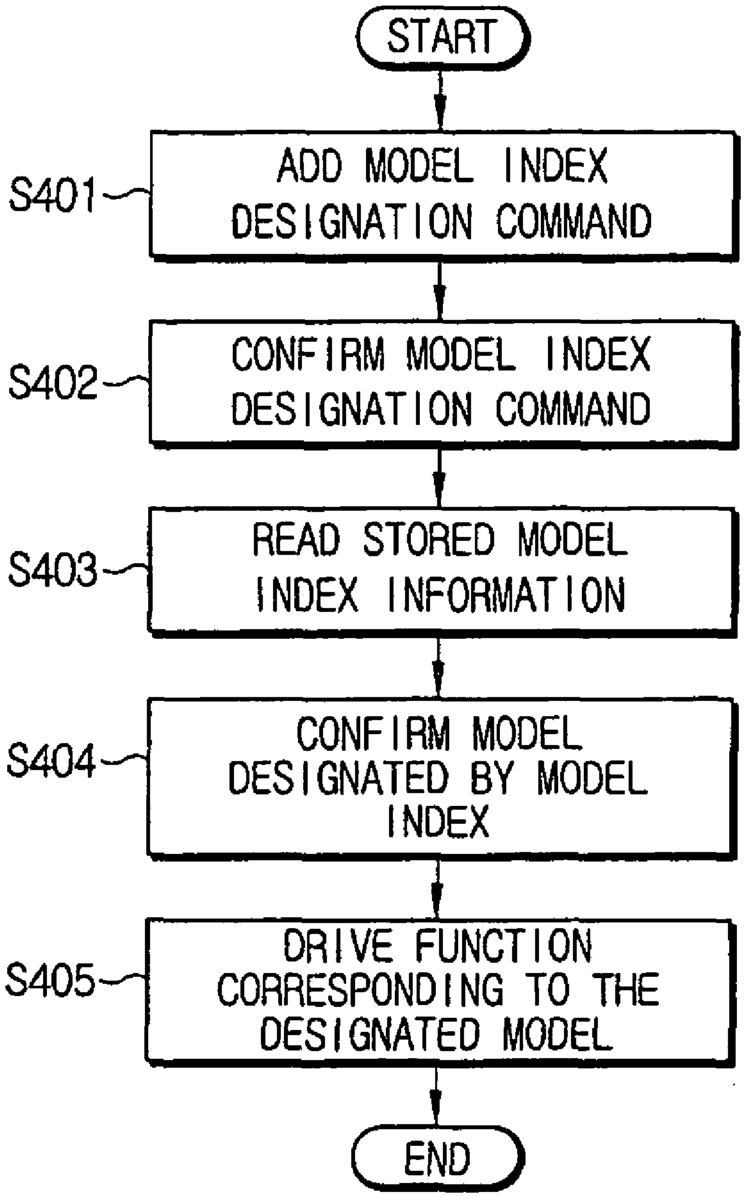
FIG. 4 is a flowchart illustrating a method of supporting the series-models according to an embodiment of the present invention.

FIG. 4 is a flowchart illustrating a method of supporting the series-models according to an embodiment of the present invention.

With reference to FIG. 4, firstly, the model index designation command is added to an initialization file of the printer (S401). The added model index designation command is processed by the model index processing unit 140 and stored in the model index storage unit 150.

When the printer is initialized by the user, the stored model index designation command is confirmed (S402).

Next, the model index processing unit 140 reads the information of the designated model from the model index storage unit 150 based on the confirmed designation command (S403). That is, the model index processing unit 140 reads information matching the index of the designated model among information that is previously stored in the model index storage unit 150.

Then, the function of the designation model is confirmed based on the read model information (S404), and the firmware driving unit 160 drives this function (S405).

A description will now be made of a case in which firmware capable of performing integrated support on model A, wherein function 1 is used while function 2 is not used, and model B, wherein function 1 is not used while function 2 is used, is implemented.

The model A is given an index code 0x01, and the model B is given an index code 0x02, and if the initialization of the printer is carried out by adding the command designating the model A to the printer initialization file (that is, index code being designated as 0x01), the model index processing unit 140 has the index code stored in the model index storage unit 150.

When the user powers on the printer so that the printer initializes, if there is the index code designating the model index in the model index storage unit 150, the model index processing unit 140 confirms the same. The model index processing unit 140 reads information on the model A corresponding to the index code from the model index storage unit 150. In other words, the model index processing unit 140 confirms that function 1 is used, and function 2 is not used, in the corresponding printer.

Next, according to the information as read, the firmware driving unit 160 drives the function 1 by activating the function 1, and inactivating the function 2.

If the index code is designated as 0x02, the firmware driving unit drives the function 2 by inactivating the function 1 and activating the function 2.

On the other hand, in a case that the index code is not designated as 0x01 or 0x02 during the initialization process, since there is no corresponding model, the printer is driven as a basic model of the model A and the model B. That is, if the model A is the basic model, the function 1 is activated and the function 2 is inactivated.

In accordance with the invention, in developing firmware for various models that are derived from a basic printer and have similar functions, it is possible to perform integrated support in the firmware only by designating a model index without having to individually develop and manage the firmware for respective models. Therefore, it is possible to save time and cost in firmware development, and the development of a new printer model also becomes easier.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A printer to perform a printing operation by driving hardware provided thereto according to a printing command received from a user, comprising:

a firmware unit to store function information of a plurality of printer models, supported by a common firmware, of the printer, and control the printer to selectively perform the function of one of the plurality of printer models which corresponds to a model index designated by a manufacturer as the printer is initialized, and wherein the common firmware is a multi-model firmware that can be used in the plurality of printer models, and the firmware unit comprises a storage unit to store the function information of the plurality of printer models therein;

a model index processing unit to store a model index designation command received from outside the firmware unit, extract from the storage unit the function information which corresponds to the model index designated by the model index designation command upon the initialization of the printer, and output the extracted function information; and a firmware driving unit to control the hardware to receive the function information and perform a corresponding function, wherein the model index designation command is transmitted along with initialization files through a printer interface during the manufacturing of the printer, so that the model index designation command is processed upon the initialization of the printer.

2. The printer of claim 1, wherein the firmware unit further comprises:

a data receiving unit to receive data from outside the firmware unit, and transmit the model index designation command to the model index processing unit in response to the model index designation command being in the received data;

a data processing unit to receive the data excluding the model index designation command from the data receiving unit, and convert the data into corresponding printer language; and a data printing unit to control the hardware to output the converted data onto a printing medium.

3. The printer of claim 2, further comprising a developing unit and a fusing unit to output the converted data onto the printing medium, wherein the developing unit and the fusing unit are controlled by the data printing unit.

4. The printer of claim 1, wherein the model index designation command is transmitted in a separate command file that is transmitted through a printer interface to be processed by the firmware unit.

5. A method of supporting a plurality of models of a printer by a common firmware, the method comprising:

storing function information of a plurality of models of the printer;

controlling the printer to selectively perform the function of one of the plurality of printer models which corresponds to a model index designated by a manufacturer, according to the function information corresponding to the printer;

inputting a model index designation command and storing the command in a file of a printer in which the common firmware is installed, during a manufacturing operation;

confirming a model index designation command which designates a model index corresponding to one of the plurality of printer models on performing an initialization of the printer;

extracting function information corresponding to the one of the plurality of printer models which is designated by the model index designation command;

confirming a function of the designated model using the function information; and performing the function based on the confirmation and controlling hardware of the printer to receive the function information and perform a corresponding function to the received function information, wherein the common firmware is a multi-model firmware that can be used in the plurality of printer models, and wherein the model index designation command is transmitted along with initialization files through a printer interface during the manufacturing of the printer, so that the model index designation command is processed upon the initialization of the printer.

6. The method of claim 5, wherein the file is an initialization file of the printer.

7. The method of claim 5, wherein the file is a separate file stored in the printer.

8. The method of claim 5, wherein the function of a basic model that is previously set is performed in response to there being no function information corresponding to the designated model index.

9. A non-transitory computer readable medium containing a firmware unit to control a printer, wherein the firmware unit stores function information of a plurality of models of the printer, and controls the printer to selectively perform the function of one of the plurality of printer models which corresponds to a model index designated by a manufacturer, according to the function information corresponding to the printer, further comprising a model index processing unit to store a model index designation command received from outside the firmware unit by a manufacturer, extract the function information corresponding to a model index designated by the model index designation command upon the initialization of the printer, and output the extracted information, and a firmware driving unit to control hardware of the printer to receive the function information and perform a corresponding function to the received function information, wherein the common firmware is a multi-model firmware that can be used in the plurality of printer models, and wherein the model index designation command is transmitted along with initialization files through a printer interface during the manufacturing of the printer, so that the model index designation command is processed upon the initialization of the printer.

10. The non-transitory computer readable medium of claim 9, further comprising a data receiving unit to receive data from outside the firmware unit, and transmit the model index designation command to the model index processing unit in response to the model index designation command being in the received data.

11. The non-transitory computer readable medium of claim 10, further comprising a data processing unit to receive the data excluding the model index designation command from the data receiving unit and convert the data into corresponding printer language.

12. The non-transitory computer readable medium of claim 11, further comprising a data printing unit to control hardware of the printer to output the converted data onto a printing medium.

* * * * *